United States Patent
Bahr

(10) Patent No.: US 7,311,191 B2
(45) Date of Patent: Dec. 25, 2007

(54) CONVEYOR SYSTEM FOR SINGULATING AND ORIENTING

(75) Inventor: Timothy A. Bahr, Brookyln Park, MN (US)

(73) Assignee: MGS Machine

( * ) Notice: Subject to any disclaimer, the term of this patent is extended or adjusted under 35 U.S.C. 154(b) by 0 days.

(21) Appl. No.: 11/233,951

(22) Filed: Sep. 24, 2005

(65) Prior Publication Data
US 2007/0068772 A1   Mar. 29, 2007

(51) Int. Cl.
*B65G 47/24* (2006.01)
(52) U.S. Cl. .................. 198/397.06; 198/396; 198/443
(58) Field of Classification Search ........... 198/415, 198/461.1, 461.2, 397.06, 443, 446, 448, 198/453, 454, 396
See application file for complete search history.

(56) References Cited

U.S. PATENT DOCUMENTS

| | | | | |
|---|---|---|---|---|
| 3,304,973 A | * | 2/1967 | Norris | 198/446 |
| 3,628,648 A | * | 12/1971 | McClusky | 198/443 |
| 4,607,483 A | * | 8/1986 | Siecke et al. | 57/334 |
| 4,747,480 A | * | 5/1988 | Wedler et al. | 198/396 |
| 5,012,913 A | * | 5/1991 | Kramer | 198/443 |
| 5,427,224 A | * | 6/1995 | Suehara et al. | 198/396 |
| 5,533,609 A | * | 7/1996 | Hulse | 198/415 |
| 6,170,637 B1 | * | 1/2001 | Ishii | 198/443 |

* cited by examiner

*Primary Examiner*—James R. Bidwell
(74) *Attorney, Agent, or Firm*—Angenehm Law Firm, Ltd.; N Paul Friederichs

(57) ABSTRACT

A conveyor system including a plurality of conveyor assemblies linearly arranged to move product from one conveyor assembly to the next conveyor assembly through to a point of discharge and each conveyor assembly having a pair of conveyors arranged in a V-shape, each conveyor assembly having an upstream end and a downstream end, each downstream end being positioned above the upstream end of any next adjacent conveyor assembly.

16 Claims, 2 Drawing Sheets

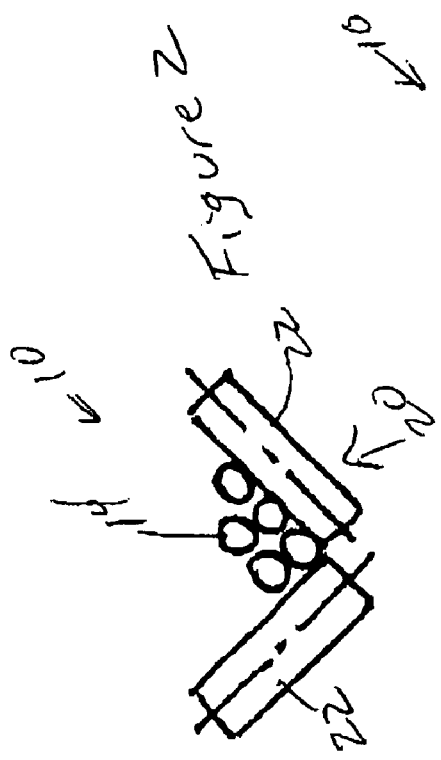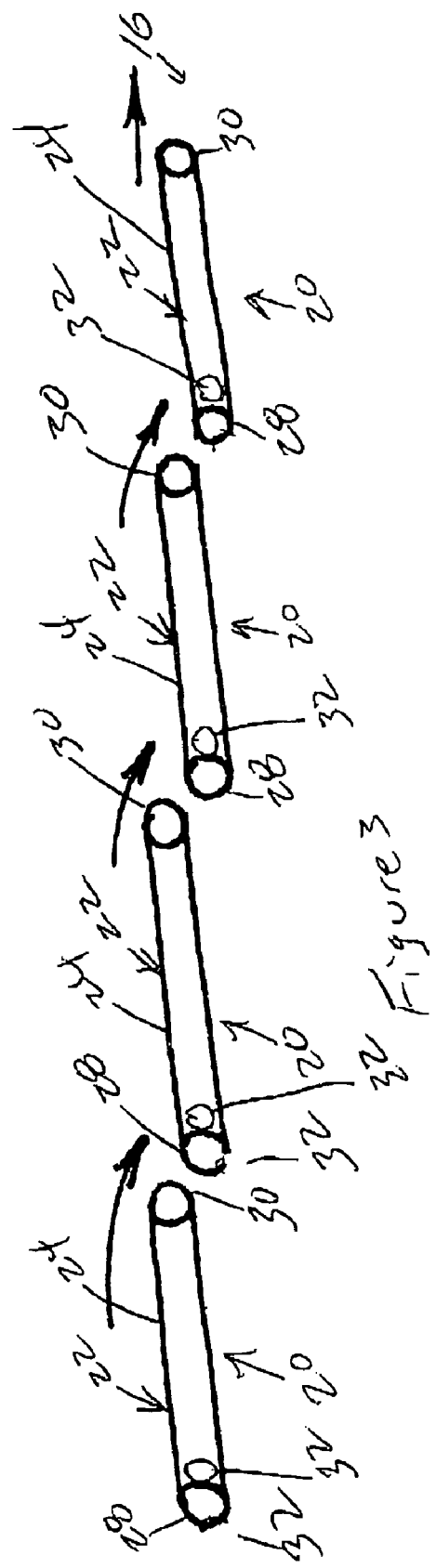

CONVEYOR SYSTEM FOR SINGULATING AND ORIENTING

FIELD OF THE INVENTION

The present invention relates to conveyor system and more particularly to conveyor systems designed to orient and singulate product.

BACKGROUND

Conveyor systems were once used to transport product from one location to another. Technologists developed new and more sophisticated systems as they discovered additional tasks that conveyor systems can perform. Today's systems are able to determine product length, gap product, orient product, singulate product and perform many other tasks.

An example of a conveyor system that determines product length is disclosed in U.S. Pat. No. 5,434,428 (Paladini). This system includes a v-shaped orientation of two conveyors in which a product is carried. Electronic eyes measure the product for length. This system does not orient product, operate the conveyor belts at divergent linear belt speeds or singulate product.

Gaping of product is the act of separating singulated product a predetermined distance. An example of a conveyor system designed to gap product is taught in U.S. Pat. No. 5,738,202 (Ydoate et al.). Electronic eyes sense the distance between product and either speed up or slow down the conveyor belts to obtain an accurate gap control. This system neither singulates nor orients product.

Other systems have been developed to orient product. That is, the conveyor system turns the product into a desired orientation for subsequent operations. An example of a conveyor system used to orient product is shown in U.S. Pat. No. 3,954,171 (Chick et al.). This conveyor system uses an electronic eye to determine whether product is properly oriented. If not, a blast of air, for instance may push the product to a secondary conveyor operating at a different speed than the primary conveyor. The speed differential orients the product. This system apparently is not designed to singulate the product while it orients the product.

Still other conveyor systems have been designed to singulate product, e.g., separate product into single pieces instead of leaving product in a messy pile. An example of a conveyor system that singulates product is shown in U.S. Pat. No. 5,333,716 (Hoppmann et al.) This conveyor system includes pockets for receiving articles, means for determining product that is not singulated and oriented, means for removing excessive or misaligned product and placing it back into the discharge bin. This particular system is complex and relies entirely on the pockets for singulating and orienting product, placing substantial effort into forcing product back into the discharge bin.

What is needed is a conveyor system that singulates and orients product without redirecting product back to the discharge bin only to be tried again. The system should be adaptable to use electronic eye technology for the purpose of gaping the product. Overall the system should be inexpensive within the field of conveyor systems, efficient with floor space constraints and generally meets or exceeds high quality and performance standards.

SUMMARY OF THE INVENTION

The present invention is a conveyor system that singulates product. The conveyor system further orients the product, while performing the singulation process. The system is adaptable to use electronic eye technology for the purpose of gaping the product. Overall the system is inexpensive within the field of conveyor systems, efficient with floor space constraints and generally meets or exceeds high quality and performance standards.

In one embodiment, the present invention is a conveyor system including a plurality of conveyor assemblies with each conveyor assemblies including a pair of conveyors. The plurality of conveyor assemblies are linearly arranged to move product from one conveyor assembly to the next conveyor assembly through to a point of discharge. The conveyor assemblies each have a pair of conveyors arranged in a V-shape. Each conveyor assembly has a beginning end and a downstream end with each downstream end being positioned above the beginning end of any next adjacent conveyor assembly.

In another embodiment the conveyor system may include a plurality of conveyor assemblies each having a pair of conveyors. The plurality of conveyor assemblies are linearly arranged to move product from one conveyor assembly to the next conveyor assembly through to a point of discharge. Each conveyor assembly has a pair of conveyors arranged in a V-shape. Each conveyor has a belt with a belt speed wherein the linear belt speeds of the conveyors within a conveyor assembly have divergent linear belt speeds.

Advantageously, the present inventive conveyor system singulates product from a disorganized pile of product.

As yet a further advantage, the present inventive conveyor system orients the product while the product is being singulated.

As still yet a further advantage, the present inventive conveyor system is adaptable to be used with electronic eye gaping technology.

These and other advantages will become clear through reading the following detailed description with reference to the appended drawings.

DESCRIPTION OF THE DRAWINGS

FIG. 2 is an end view of a conveyor assembly with product positioned thereon; and FIG. 3 is a partial side view showing the relation of conveyors to subsequent conveyors.

DETAILED DESCRIPTION

Figure 1:
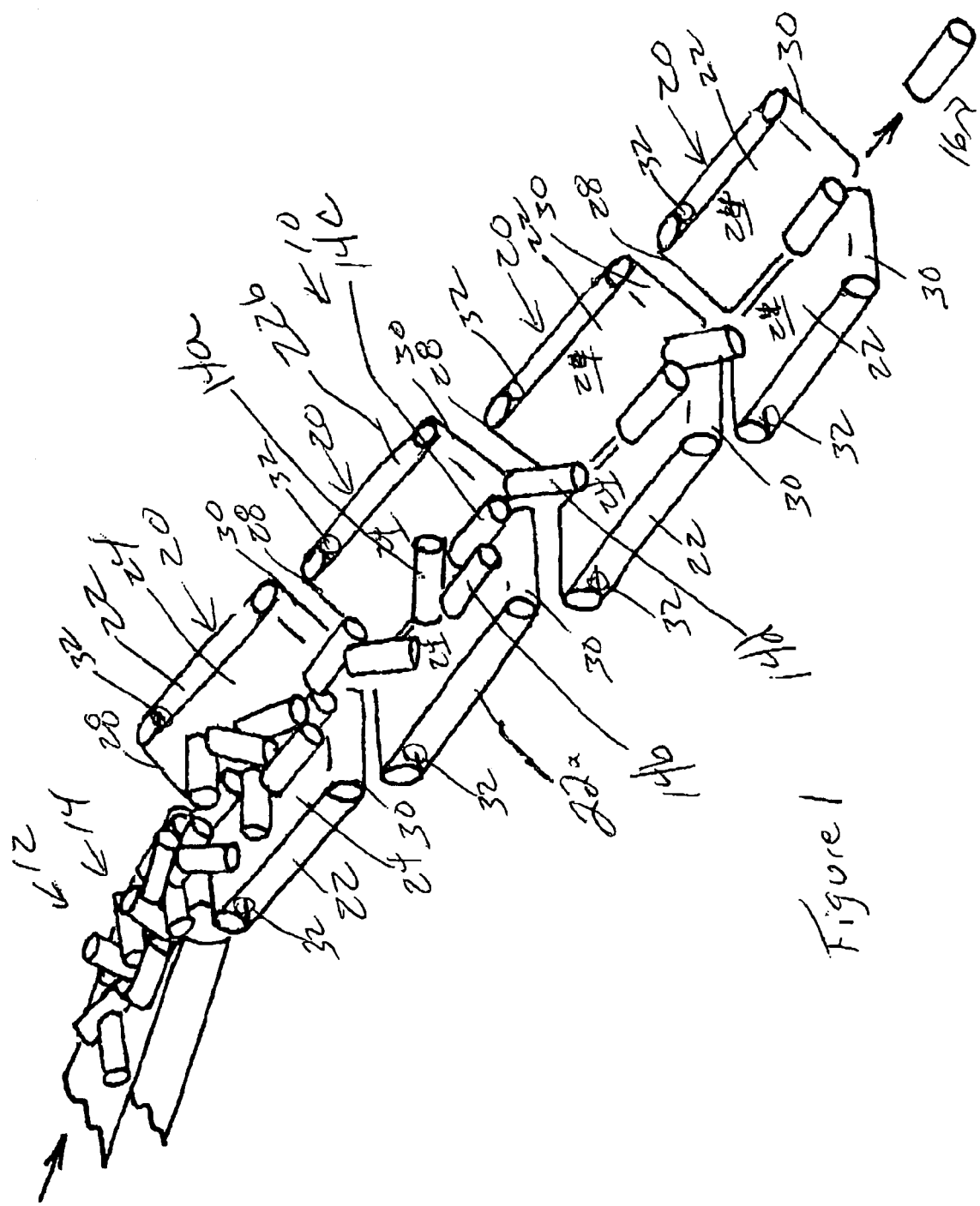
FIG. 1 is a perspective view of the conveyor system with the supporting framework removed to better illustrate the relations between the conveyor assemblies.

The present conveyor system 10 for singulating and orienting product 14 may be provided with a discharge bin 12 and a plurality of conveyor assemblies 20. The product 14 may be any product, although the present invention intends for product 14 to have at least some modicum of elongation. These components and interactions will now be described with reference to the preferred embodiment.

The discharge bin 12 may be any machine or equipment capable of depositing product 14 onto the conveyor assemblies 20. Such depositing may occur directly or with the aid of other placement equipment. This conveyor system 10 expects that the product 14 will be deposited in a disorganized bulk-type approach. The conveyor assemblies 20 thereafter singulate and orient the product.

The conveyor system 10 further includes a plurality of conveyor assemblies 20 positioned to receive product 14 from the discharge bin 12. The preferred number of conveyor assemblies 20 is three to seven, but the number can vary widely depending upon the performance of the conveyor system 10 with regard to any particular product 14 being run on the conveyor and capabilities of the discharge bin 12. The number of conveyor assemblies 20 should be sufficient to consistently singulate and orient the product 14. The conveyor assemblies 20 are preferably arranged linearly to move product 12 from one conveyor assembly 20 to the next conveyor assembly 20 through to a point of discharge 16.

Each conveyor assembly 20 may have a pair of conveyors 22 arranged in a V-shape as shown in FIG. 2. Each conveyor assembly 20 has a beginning end 28, where the product 14 first enters onto the conveyor assembly, and a downstream end 30, where the conveyor end leaves the particular conveyor assembly 20. Each downstream end 30 is positioned above the beginning end 28 of any next adjacent conveyor assembly 20, creating a waterfall-type of effect.

Each conveyor 22, subset of a conveyor assembly 20, is independently driven with drives 32. Each conveyor 22 has a belt 24 with a linear belt speed, e.g. the linear speed of the belt while rotating. The conveyors 22 of each conveyor assembly have divergent, e.g. dissimilar, linear belt speeds the purpose of which is described further below. It is desired that the faster conveyor 22 alternates sides as the product 14 moves from conveyor assembly 20 to conveyor assembly 20 as a further aid to singulation. Both linear belt speeds of each conveyor assembly 20 are slower than the linear belt speeds of all subsequent, e.g., downstream, conveyors 22, the purpose of which is described shortly below.

The divergent linear belt speeds of a pair of conveyors 22 within one conveyor assembly has a function of orienting the product 14. With reference to FIG. 1, one piece of product 14 has been designated as 14a, which will be used as an illustration of the orientation feature. Conveyor 22a may have a slower linear belt speed than conveyor 22b. Thus, the end of product 14a resting on conveyor 22a will move at a slower speed than the end of product 14a, resting on conveyor 22b. Due to the speed differential, the ends of product 14a move relative to each other, e.g. rotate until the product 14a is able to reach an equilibrium, e.g. orientation. This orientation has been tested. FIG. 1 is a reasonable approximation of the experienced result. The V-shape of the conveyor assembly 20 also has been found to impact orientation.

The orientation and singulation within a conveyor assembly 20 may be augmented by friction coefficients of the belts 24. The belt 24, for instance, with a faster linear belt speed may have a friction coefficient higher than the belt 24 with a slower linear belt speed. Frictions coefficients of the belts 24 may be the same or different within a conveyor assembly 20 the same or different within the whole conveyor system 10.

The linear belt speed within one conveyor assembly 20 also has the function of singulating product 14. Reference is made to product 14b and 14c in FIG. 1 for illustration purposes of this feature. Product 14b is resting on conveyor 22a and product 14c, whereas product 14c is resting on conveyor 22b with its faster belt speed. Should belts 24 have a higher friction coefficient than the product 14, product 14b and 14c will side relative to each other such that products 14b and 14c tend to travel the speed on the belt 24 on which they respectively rest. The advancement of 14c being faster than the advancement of product 14b singulates products 14b and c.

The waterfall-type effect and the sequential stepping of belt speeds between conveyor assemblies in combination have the function of singulating the product. Since two pieces of product 14 rarely reaches the downstream end 30 at the identical moment, the first product 14 to reach the next conveyor assembly 20 accelerates relative to the later product reaching the next conveyor assembly thereby singulating. As an example, product 14d has reached the next conveyor assembly 20, both of which belts move faster than conveyor 22a and 22b. Accordingly, product 14d moves faster than product 14b and is singulating from 14b. The waterfall-type effect is believed to substantially limit the impact any one conveyor assembly 20 has on a piece of product, making the speeds of the pieces of product. 14 distinct and not averaged when moving from one conveyor assembly 20 to another.

Although the present invention has been described with reference to preferred embodiments, workers skilled in the art will recognize changes may be made in form and detail without departing from the spirit and scope of the invention. For instance, the bottom of the v-shape may include a gap that allows space for an electronic eye. The electronic eye and computer control of the independent drives allows for controlled gaping if desired.

The invention claimed is:

1. A conveyor system, comprising:
a discharge bin having product;
a plurality of conveyor assemblies positioned to receive product from the discharge bin and the conveyor assemblies arranged linearly to move product from one conveyor assembly to the next conveyor assembly through to a point of discharge;
each conveyor assembly having a pair of conveyors arranged in a V-shape, each conveyor assembly having an upstream end and a downstream end, each downstream end being positioned above the upstream end of any next adjacent conveyor assembly; and
each conveyor being independently driven, each conveyor having a belt with a linear belt speed and with a friction coefficient, the conveyors of each conveyor assembly having divergent linear belt speeds, the belts of at least one conveyor assembly having divergent friction coefficients and both linear belt speeds of each conveyor assembly being slower than the linear belt speeds of all subsequent conveyors.

2. A conveyor system, comprising:
a plurality of conveyor assemblies linearly arranged to move product from one conveyor assembly to the next conveyor assembly through to a point of discharge; and
each conveyor assembly having a pair of conveyors arranged in a V-shape, each conveyor assembly having an upstream end and a downstream end, each downstream end being positioned above the upstream end of any next adjacent conveyor assembly wherein each conveyor has a belt with a linear belt speed and a friction coefficient, wherein the conveyors of at least one of the conveyor assemblies has divergent linear belt speeds and has divergent friction coefficients.

3. The device of claim 2 further comprising
a discharge bin having product positioned to discharge product to the plurality of conveyor assemblies.

4. The device of claim 2 wherein each conveyor is independently driven.

5. The device of claim 2 wherein the conveyors of each of the conveyor assemblies have divergent linear belt speeds.

6. The device of claim 2 wherein both linear belt speeds of each conveyor assembly are slower than the linear belt speeds of all subsequent conveyors.

7. The device of claim 2 wherein the belt with the faster belt speed within a conveyor assembly has a friction coefficient higher than the belt with the slower belt speed.

8. The device of claim 2 wherein the belts of at least one conveyor assembly has the same friction coefficient.

9. A conveyor system, comprising:

a plurality of conveyor assemblies linearly arranged to move product from one conveyor assembly to the next conveyor assembly through to a point of discharge; and each conveyor assembly having a pair of conveyors arranged in a V-shape, each conveyor having a belt with a belt speed wherein the linear belt speeds of the conveyors of one conveyor assembly are divergent linear belt speeds wherein the belt with a faster linear belt speed has a friction coefficient higher than the belt with a slower linear belt speed in at least one conveyor assembly.

10. The device of claim 9 further comprising a discharge bin having product positioned to discharge product to the plurality of conveyor assemblies.

11. The device of claim 9 wherein each conveyor is independently driven.

12. The device of claim 9 wherein each conveyor assembly has an upstream end and a downstream end.

13. The device of claim 12 wherein each downstream end is positioned above the upstream end of any next conveyor assembly.

14. The device of claim 9 wherein both linear belt speeds of each conveyor assembly are slower than the linear belt speeds of all subsequent conveyors.

15. The device of claim 9 wherein the belt with a faster linear belt speed has a friction coefficient higher than the belt with a slower linear belt speed in each conveyor assembly.

16. The device of claim 9 wherein the belts of at least one conveyor assembly have the same friction coefficient.

* * * * *